(12) United States Patent
Tavoletti et al.

(10) Patent No.: US 6,721,949 B1
(45) Date of Patent: Apr. 13, 2004

(54) KERNEL ABSTRACTION LAYER FOR DIGITAL TELEVISION SET-TOP BOX FIRMWARE

(75) Inventors: Donald Tavoletti, Warrington, PA (US); Jeffrey T. Davis, Doylestown, PA (US); Chris Del Sordo, Souderton, PA (US); Jack M. Birnbaum, Southampton, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/535,899

(22) Filed: Mar. 27, 2000

(51) Int. Cl.$^7$ .......................... G06F 15/163; G06F 9/00; G06F 9/54
(52) U.S. Cl. ..................................................... 719/310
(58) Field of Search ............................... 709/319, 310, 709/328; 717/145, 168–178

(56) References Cited

U.S. PATENT DOCUMENTS

| | | | |
|---|---|---|---|
| 5,764,984 A | * 6/1998 | Loucks | 709/319 |
| 5,809,145 A | * 9/1998 | Slik et al. | 705/52 |
| 6,026,238 A | * 2/2000 | Bond et al. | 717/141 |
| 6,393,496 B1 | * 5/2002 | Schwaderer et al. | 709/328 |
| 6,418,555 B2 | * 7/2002 | Mohammed | 717/169 |

FOREIGN PATENT DOCUMENTS

| EP | 0 813 147 | 12/1997 |
|---|---|---|
| EP | 0 908 821 | 4/1999 |
| EP | 0 909 094 | 4/1999 |

OTHER PUBLICATIONS

Evain, J.P.,"The Multimedia Home Platform," *EBU Technical Review*, Spring 1998, pp. 4–10.
Special Report: Set–Top Box Design, "STB operating systems gear up for flood of data services," *Computer Design*, Feb. 1996, pp. 67–68, 72, 74–76, 78 and 80.
"Proposed TR10000–3 Taxonomy additions for SC22 POSIX based Profiles," SC22/WG15N687 report attachment #1, www.ex.ac.uk/˜Dcannon/WG15/n687.htm, Oct. 16, 1996.
Rath, K., et al., "Set–Top Box Control Software: A Key Component in Digital Video", Philips Journal of Research, vol. 50, No. 1/2, 1996, pp. 185–199.

* cited by examiner

*Primary Examiner*—John Follansbee
*Assistant Examiner*—Diem Cao
(74) *Attorney, Agent, or Firm*—Barry R. Lipsitz; Douglas M. McAllister

(57) ABSTRACT

A method and apparatus for providing abstraction layers in the hierarchical structure of a set-top terminal to enable the set-top's firmware to be compatible with different operating systems. An operating system (OS) kernel interface is provided using a first OS abstraction layer that is OS-independent, and a second abstraction layer that is OS-dependent. The interface enables the terminal's firmware to access the kernel's set of functions independently of the OS. The abstraction layers provide an interface for kernel functions for the following kernel constructs: Timers, Threads, Memory, Synchronization and Messaging. The invention benefits terminal manufacturers and developers as well as network operators by allowing set-top firmware to run without modifications due to a change in the set-top's OS.

20 Claims, 1 Drawing Sheet

KERNEL ABSTRACTION LAYER FOR DIGITAL TELEVISION SET-TOP BOX FIRMWARE

BACKGROUND OF THE INVENTION

The present invention relates to firmware for a digital set-top terminal, such as those used in cable and satellite television networks. In particular, the invention provides a method and apparatus for abstracting the operating system (OS) kernel from the firmware to provide one common archive that works with multiple operating systems.

The recent advent of digital set-top terminals has spurred the growth of subscriber television networks, such as cable/satellite television networks. Such terminals can support increased levels of programming services and a variety of software-based applications/functions, such as an electronic program guide, stock or weather banners, shop and bank at home services, games, and the like. Moreover, this trend is expected to continue with the convergence of telephone, television and computer networks, and the rise of in-home computer networks. Despite its name, the "set-top terminal", also known as a decoder, can be located anywhere near a television, or may have its functions built into the television.

Each terminal includes different hardware devices and other function, for example, tuners, demodulators, MPEG-2 Decoders (e.g., audio, video, and data), video encoders, audio mixers, and so forth, which are controlled according to an operating system (OS) platform of the terminal. The OS has a hierarchical structure wherein functions are separated according to their level of abstraction. The least abstract level is the hardware device level, while the most abstract level is typically the firmware level, where client applications operate. Such applications can include on-screen program guides and a variety of other functions, e.g., as mentioned previously.

Additionally, each level manages a set of objects, which can be hardware or software objects, and defines operations that can be carried out on the objects.

However, conventionally it is necessary for different firmware to be implemented separately for each operating system platform, e.g., for different set-top manufacturers, different set-top models from the same manufacturer, or different OS platforms on a single hardware platform. Different terminals in the same network can even have different operating systems.

Generally, continual operating system changes in set-top terminals are a result of improvements, cost reductions, new components, and second source manufacturers. This is problematic since it creates confusion and requires additional record keeping to maintain a history of the status of each terminal in a network. Additionally, updated software/firmware must be developed and provided to the terminals, which leads to additional expense for the network provider.

The development cycle for firmware can be lengthy and costly for the network operator.

These problem are compounded by the continual upgrading and replacement of terminals in a network as technology advances.

Accordingly, it would be desirable to allow a television network operator to use different set-top operating systems which are compatible with a common, generic (e.g., operating-system independent) set of firmware.

The technique should allow the set-top firmware to be implemented only once while being usable under several operating systems and set-top platforms. One such suitable platform is the DCT5000 series terminals, manufactured by General Instrument Corporation, the assignee hereof.

The interface should allow the sharing of architecture and code across both OS platforms and hardware platforms.

The interface should be implementable using object-oriented programming and analysis techniques, including Java or C++ programming languages. The interface should alternatively be implementable using procedure-oriented programming languages.

The present invention provides a system having the above and other advantages.

SUMMARY OF THE INVENTION

The present invention relates to a method and apparatus for providing an abstraction layer in the hierarchical structure of a set-top terminal to enable the set-top's firmware to be compatible with different operating systems.

A particular method is provided for allowing communication between a client and a particular operating system in a terminal. The method includes the steps of: providing a first abstraction layer for receiving an operating system-independent kernel request from the client; providing a second abstraction layer that is specific to the particular operating system for converting the operating system-independent kernel request to a request that is specific to the particular operating system; and providing the operating system-specific kernel request from the second abstraction layer to a layer in which the particular operating system is implemented for use thereat.

A corresponding apparatus is also presented.

BRIEF DESCRIPTION OF THE DRAWINGS

The Figure illustrates a hierarchical structure for a set-top terminal in accordance with the present invention.

DETAILED DESCRIPTION OF THE INVENTION

Figure 1:
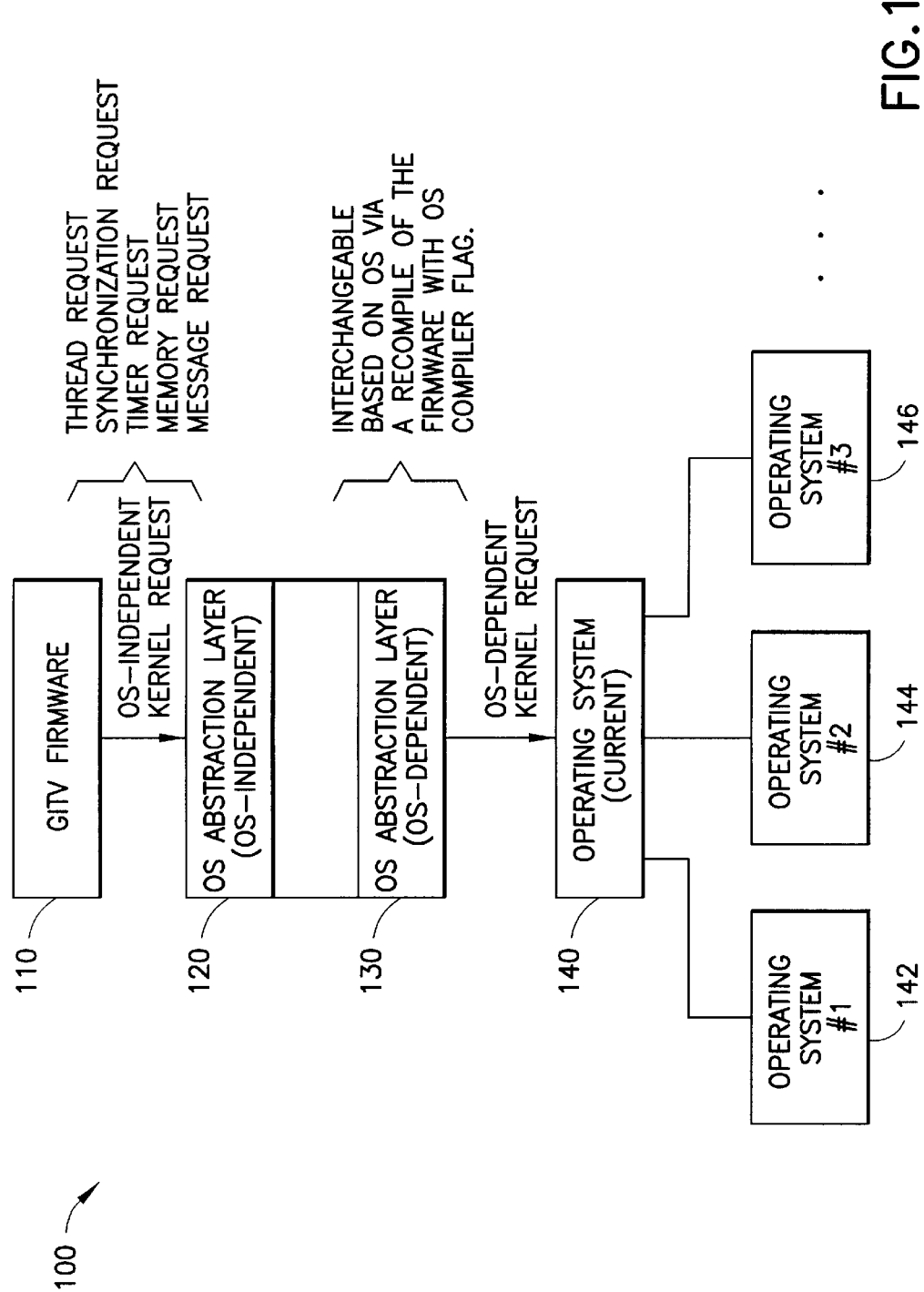

The present invention relates to firmware for a digital set-top terminal.

The Figure illustrates a hierarchical structure for a set-top terminal in accordance with the present invention.

The present invention address the need to enable a television network operator to field terminals that use different operating systems, while keeping the firmware for the terminals as generic as possible. This is accomplished by abstracting the operating system's kernel to provide an abstraction layer. With this abstraction layer, the firmware can remain generic, and its kernel calls don't need to change if the OS changes. This is accomplished in that the kernel calls are really calls to the abstraction layer and not to the actual kernel of the OS.

The hierarchical structure 100 of the Figure includes a firmware layer 110, which may include firmware for various client applications. "GITV firmware", proprietary to the assignee hereof, is an example of such firmware. A first OS abstraction layer 120 is independent of the particular OS the terminal uses.

The firmware 110 provides OS-independent kernel requests to the abstraction layer 120. Such requests can include, for example, a thread request, a synchronization request, a timer request, a memory request and a message request.

A second OS abstraction layer 130 is dependent on the particular OS the terminal uses. This layer is interchangeable based on the OS via a re-compile of the firmware with an OS compiler flag. That is, a re-compile will bring in (incorporate) the proper OS-dependent pieces of the abstraction layer.

An operating system layer 140 indicates the current OS, which can be any one of a number of different operating systems that are in use in the terminal population in a network. For example, the operating system layer 140 can include operating systems 1 (142), 2 (144), 3 (146) and so forth.

The second abstraction layer 130 provides OS-dependent kernel requests to the OS layer 140.

Preferably, the major OS constructs are provided to the firmware with a common interface that is independent of the OS.

Additionally, the different operating systems that may be in use in a network should be researched to develop a common interface for each construct. The firmware should be able to use the abstracted layers interface.

Moreover, software code for the kernel interface (i.e., abstraction layers 120 and 130) should be written so that the parameters and return values are generic, and independent of any one OS. The actual implementation of the kernel function is OS dependent, and uses the specific parameter passed in to perform its specific task. Only the parameters that are specific to the current OS are used.

Accordingly, it can be seen that the present invention provides an OS kernel interface for set-top terminal firmware that enables the firmware to access the kernel's set of functions independently of the current OS.

The abstraction layer provides an interface for kernel functions, e.g., for the following kernel constructs: Timers, Threads, Memory, Synchronization and Messaging.

The invention benefits terminal manufacturers and developers as well as network operators by allowing set-top firmware to run without modifications due to a change in the set-top's OS. Network operators, such as cable and satellite television network operators, can therefore change operating systems without requiring the firmware to change.

The invention provides savings in time and money by eliminating the need to change the firmware's implementation based on each OS.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as local area networks (LANs), metropolitan area networks (MANs), wide area networks (WANs), internets, intranets, and the Internet, or combinations thereof, may be used.

Moreover, the invention may be implemented using any known hardware, firmware and/or software techniques.

What is claimed is:

1. A method of communicating between a client and a particular operating system executing on a terminal, comprising the steps of:
   making an operating system-independent request for a functionality to a kernel interface that presents an interface to a predetermined set of functionalities provided by a plurality of dissimilar operating systems;
   receiving said operating system-independent request at said kernel interface; and
   translating said operating system-independent request to a request for said functionality that is dependent upon the particular operating system; wherein:
   the kernel interface includes a first abstraction layer for receiving the operating system-independent request, and a second abstraction layer for implementing said translating step;
   said first abstraction layer is an operating system independent layer; and
   said second abstraction layer is an operating system dependent layer which is adaptable to different operating systems via a re-compile of terminal firmware which incorporates operating system dependent pieces into the second abstraction layer based on a compiler flag which identifies the particular operating system of the terminal.

2. The method of claim 1, wherein:
   the operating system-independent request is made by the client.

3. The method of claim 1, wherein:
   the operating system-independent request comprises a thread request.

4. The method of claim 1, wherein:
   the operating system-independent request comprises a synchronization request.

5. The method of claim 1, wherein:
   the operating system-independent request comprises a timer request.

6. The method of claim 1, wherein:
   the operating system-independent request comprises a memory request.

7. The method of claim 1, wherein:
   the operating system-independent request comprises a message request.

8. The method of claim 1, wherein:
   the terminal is a subscriber television terminal in a network.

9. The method of claim 1, wherein:
   the terminal is in a broadband communication network.

10. The method of claim 1, wherein:
    parameters provided to the kernel interface by the client, and return values returned to the client by the kernel interface, are independent of said plurality of dissimilar operating systems.

11. An apparatus for enabling communication between a client and a particular operating system executing on a terminal, comprising:
    a kernel interface for receiving an operating system-independent request for a functionality; wherein:
    said kernel interface presents an interface to a predetermined set of functionalities provided by a plurality of dissimilar operating systems, and translates said operating system-independent request to a request for said functionality that is dependent upon the particular operating system; wherein
    the kernel interface includes a first abstraction layer for receiving the operating system-independent request, and a second abstraction layer for implementing said translating;
    said first abstraction layer is an operating system independent layer; and
    said second abstraction layer is an operating system dependent layer which is adaptable to different operating systems via a re-compile of :terminal firmware which incorporates operating system dependent pieces into the second abstraction layer based on a compiler flag which identifies the particular operating system of the terminal.

12. The apparatus of claim 11, wherein:

the operating system-independent request is made by the client.

13. The apparatus of claim 11, wherein:

the operating system-independent request comprises a thread request.

14. The apparatus of claim 11, wherein:

the operating system-independent request comprises a synchronization request.

15. The apparatus of claim 11, wherein:

the operating system-independent request comprises a timer request.

16. The apparatus of claim 11, wherein:

the operating system-independent request comprises a memory request.

17. The apparatus of claim 11, wherein:

the operating system-independent request comprises a message request.

18. The apparatus of claim 11, wherein:

the terminal is a subscriber television terminal in a network.

19. The apparatus of claim 11, wherein;

the terminal is in a broadband communication network.

20. The apparatus of claim 11, wherein:

parameters provided to the kernel interface by the client, and return values returned to the client by the kernel interface, are independent of said plurality of dissimilar operating systems.

* * * * *